US007234743B2

(12) United States Patent
Robinson

(10) Patent No.: US 7,234,743 B2
(45) Date of Patent: Jun. 26, 2007

(54) VACUUM DRIVEN LIGHT BULB CHANGER

(76) Inventor: Jonnie D. Robinson, 2425 Stark Rd., Midland, MI (US) 48642

( * ) Notice: Subject to any disclaimer, the term of this patent is extended or adjusted under 35 U.S.C. 154(b) by 0 days.

(21) Appl. No.: 11/166,507

(22) Filed: Jun. 24, 2005

(65) Prior Publication Data

US 2006/0290152 A1 Dec. 28, 2006

(51) Int. Cl.
*B25J 15/06* (2006.01)

(52) U.S. Cl. .................................... 294/64.1; 81/53.11

(58) Field of Classification Search ............... 294/64.1, 294/65, 64.2, 64.3, 19.1; 81/83.11
See application file for complete search history.

(56) References Cited

U.S. PATENT DOCUMENTS

| | | | |
|---|---|---|---|
| 1,024,286 A | 4/1912 | Santilli | |
| 2,243,106 A | 5/1941 | Limbert | |
| 2,545,043 A | 3/1951 | Odenthal | |
| 2,634,998 A | 4/1953 | Flower | |
| 2,983,541 A | 5/1961 | Maki | |
| 4,901,606 A * | 2/1990 | Christensen | 294/64.1 |
| 4,925,225 A * | 5/1990 | Dost | 294/64.1 |
| 5,148,723 A | 9/1992 | Newman, Sr. | |
| 5,218,889 A | 6/1993 | Brockberg | |
| 5,795,001 A * | 8/1998 | Burke | 294/64.1 |
| 5,902,293 A * | 5/1999 | Liu | 604/313 |
| 6,170,894 B1 * | 1/2001 | Baker et al. | 294/64.1 |

* cited by examiner

*Primary Examiner*—Patrick Mackey
*Assistant Examiner*—Paul T. Chin
(74) *Attorney, Agent, or Firm*—Robert L. McKellar; McKellar IP Law, PLLC

(57) ABSTRACT

A vacuum driven light bulb changer. The device has a power source that energizes an electrical circuitry so that when the power switch is activated it energizes a motor that activates a vacuum pump. The activation of the vacuum pump draws air into the intake head on the vacuum cup. When the vacuum cup is place firmly against the outside surface of a light bulb, the vacuum creates a depressurized zone against the outside surface of the light bulb and the inside bottom surface of the vacuum cup allowing the turning of the light bulb.

13 Claims, 3 Drawing Sheets

VACUUM DRIVEN LIGHT BULB CHANGER

The present invention is a vacuum driven light bulb changer that engages the bulb via the vacuum cup with the vacuum activated thus drawing the vacuum cup securely against the surface of the bulb allowing the bulb to be rotated in either a clockwise or counter clockwise direction to install or remove bulbs, then the release mechanism is triggered releasing the vacuum surrounding the bulb inserted into the vacuum cup releasing the bulb into a lighting fixture or into the possession of the operator.

BACKGROUND OF INVENTION

The use of suction attachment devices in the changing of light bulbs is well known in the art. These devices generally are in the form of a suction cup mounted to an extension or telescoping handle that allows access to light fixtures at varying elevations. The suction cup is made of a somewhat flexible rubber that when pressure is applied against the light bulb a vacuum is created against the light bulbs surface and the inside bottom surface of the suction cup which in turn allows the handle to be manipulated removing or inserting the light bulb then generally the seal formed by the suction action is released. An example of such a device is present in U.S. Pat. No. 5,148,723 issued to Newman Sr., on Sep. 22, 1992. Another such device is U.S. Pat. No. 2,634,998 issued to Flower on Apr. 14, 1953 wherein the suction cup is mounted on a handle with a release mechanism for releasing the vacuum. Another example of this type of device is the U.S. Pat. No. 2,545,043 issued to Odenthal on Mar. 13, 1951 with the suction cup mounted to a handle with an internal pressure release that takes the form of a chain. Yet another example of this type of device is U.S. Pat. No. 2,243,106 issued to Limbert on May 27, 1941 where a suction cup is mounted to a handle with a release present to release the light bulb. All of these devices are very similar in that that require a pressure applied upon the cup and the light bulb creating a vacuum then after the desired manipulation of the light bulb the vacuum seal is released and the bulb is free from the device.

The present invention has a great advantage over this group of devices in that the instant invention has a power electrically driven vacuum pump that creates and maintains the vacuum around the bulb until the depressurization release is triggered releasing the cup and the vacuum from the bulb.

There is another group of devices that requires the evacuation of air from a device to form the vacuum in a cup by hand manipulation of a rubber bulb or by a plunger. The United States Patent issued to Maki on May 9, 1961 is such a device. By manipulating the rubber ball at one end of the device the air is evacuated through a passage that runs to the suction cup forming the vacuum that holds the bulb in the vacuum cup. U.S. Pat. No. 5,218,889 issued on Jun. 15, 1993 which also has a rubber bulb that is connected to the suction cup. When the bulb is manipulated it evacuates the air via an air passage that connects the rubber bulb and the suction cup. U.S. Pat. No. 1,024,286 issued to Santilli on Apr. 23, 1912 suggests both methods, that is, a rubber bulb for creation of the vacuum or a hand manipulated pump for the creation of the vacuum. These devices still fall short because they do not supply a continuously activated power driven vacuum as does the instant invention.

THE INVENTION

The invention is a light bulb changer comprising in combination an outer casing that has a near end and a distal end. The near end has a vacuum cup assembly mounted on it. The vacuum cup of the assembly has a inside bottom surface. The distal end of the outer casing has attached thereto an extension attachment. The extension attachment has a distal end which is configured to provide an extension handle. The vacuum cup assembly has a near end and a distal end. The vacuum cups distal end connects to a flexible neck. The vacuum cups near end having an outside surface, inside bottom surface and a protrusion therethrough incorporating the vacuum intake head. Mounted to the outside surface of the vacuum cup is a release mechanism.

The outer casing containing said vacuum pump located near the near end of the outer casing, a distal end and an outside surface, said vacuum pump near end having connected thereto, a first vacuum line, the distal end of the vacuum pump being connected to an electrically driven motor. The outside surface of the vacuum pump has an exhaust port. Adjacent the distal end of the vacuum pump is an electric motor, this motor having a near end and a distal end. The near end of the motor is adjacent the distal end of said vacuum pump. The distal end of the motor has circuitry proceeding to a power switch, the power switch having a top end and a bottom end. The circuitry proceeds to a power source then the circuitry continues to the motor completing the circuit.

The first vacuum line has a near end and a distal end, the first vacuum lines near end contains a check valve. The first vacuum lines distal end is attached to the vacuum pump.

The check valve has a near end, a distal end; an internal passageway and an in line check system. The check valve near end is connected to a second vacuum line, this check valves distal end connects to the first vacuum line.

The second vacuum line near end is connected to a vacuum intake head, this vacuum intake head has a near end and a distal end. The vacuum intake head distal end is connected to the second vacuum line. This vacuum intake head near end has an opening that allows the passage of air through it. This vacuum intake head is located essentially centered in the bottom inside surface of the vacuum cup.

A flexible neck, having a near end, distal end and a flexible outside surface, the distal end of the flexible neck is connected to the main body of light bulb changer. The near end of the flexible neck is connected to the vacuum cup assembly.

The release mechanism has a near end and a distal end, the release mechanism near end connects to the outside surface of the vacuum cup, the release mechanism distal end is attached to a pull device.

DETAILED DESCRIPTION OF THE DRAWINGS

Figure 1:
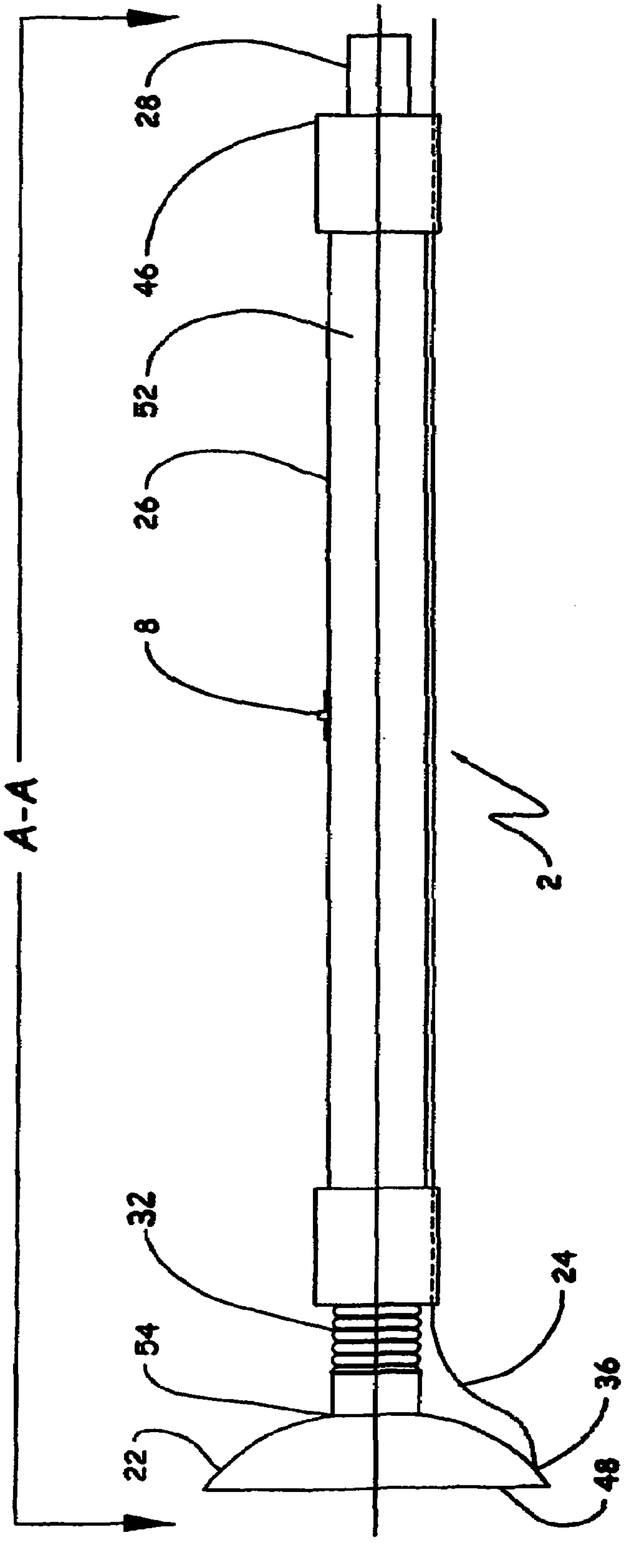
FIG. 1 is a full external view of the light bulb changer

FIG. 1 is a full side view of the light bulb changer 2 showing the power switch 8 protruding from the outer casing 26. The distal end 46 of main body 52 shows the location of the extension attachment 28. The near end 44 of the main body 52 shows the transition from the main body 52 into the vacuum cup assembly 54. The vacuum cup assembly 54 is comprised of the vacuum cup 22, the near end 48 of vacuum cup assembly 54. Also present is the distal end 50 of the vacuum cup assembly 54. Attached to the outside surface 36 is the release mechanism 24. Also present is the line A—A.

Figure 2:
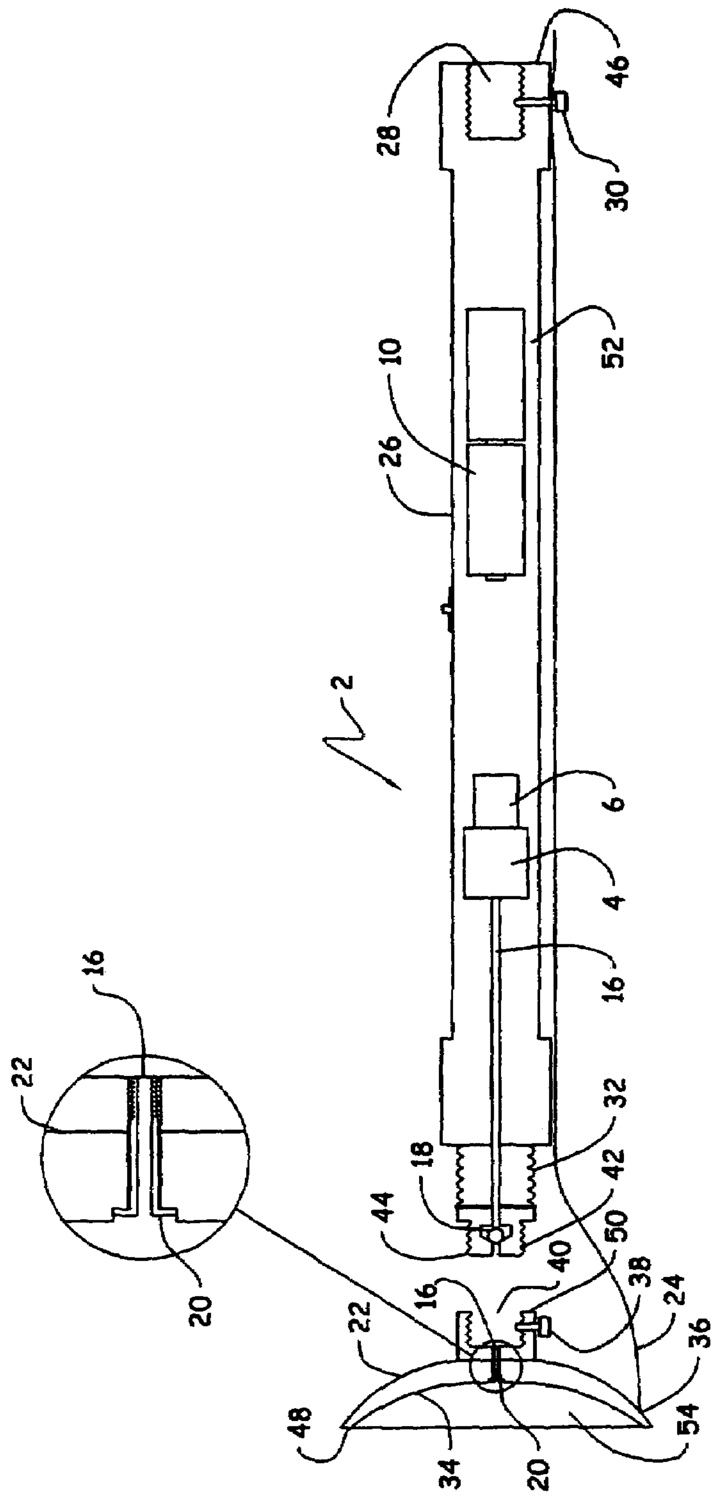
FIG. 2 is a full sectional view along line A—A of the light bulb changer

FIG. 2 represents a sectional view of the light bulb changer 2 along line A—A. Within the outer casing 26 is the vacuum pump 4 that is powered by the motor 6 which is energized by power source 10. When the vacuum pump 4 is energized it creates a vacuum within the vacuum line 16. The vacuum line 16 proceeds internally through the outer casing 26 through the flexible neck 32 connecting with the check value 18. The check valve consists of any type of check valve suitable for this type of application. This embodiment uses a check valve with a ball bearing stop. The main body 52 terminates at its near end 44. The near end 44 of the main body 52 resembles a male configuration 42 whereas it will fit or accommodate the female end 40 of the vacuum cup assembly 54 which is located at the distal end 50 of the vacuum cup assembly 54. Holding the vacuum cup assembly 54 to the main body 52 is fastener 38. In this embodiment the fastener takes on the form of a set screw that penetrates the distal end 50 of the vacuum assembly 54 coming to rest against the male configuration 42 of the main body 52. The embodiment of FIG. 1 does not require a set screw or fastener. The vacuum line 16 continues forward until it connects with the vacuum intake head 20. The vacuum intake head 20 is located at the termination of the vacuum line 16 at the inside bottom surface 34 of the vacuum cup 22. Also attached to the outside surface 36 of the vacuum cup assembly 54 is the release mechanism 24.The near end 48 of the light bulb changer 2 is where the light bulb is engaged against the inside bottom surface 34 of the vacuum cup assembly 54 and the vacuum pump 4 is energized forming a zone of decompression around the surface of the light bulb allowing the device to be rotated in either direction engaging or disengaging the light bulb from its fixture. The distal end 46 of the main body 52 is characterized by another female configuration 28 that receives devices for the extension of the light bulb changer 2. In this embodiment it is threaded allowing the insertion of a threaded handle portion to extend the distance at which the device is used. Again, in this embodiment there is a fastener or extension attachment set screw 30 that will secure the extension handle into place.

Figure 3:
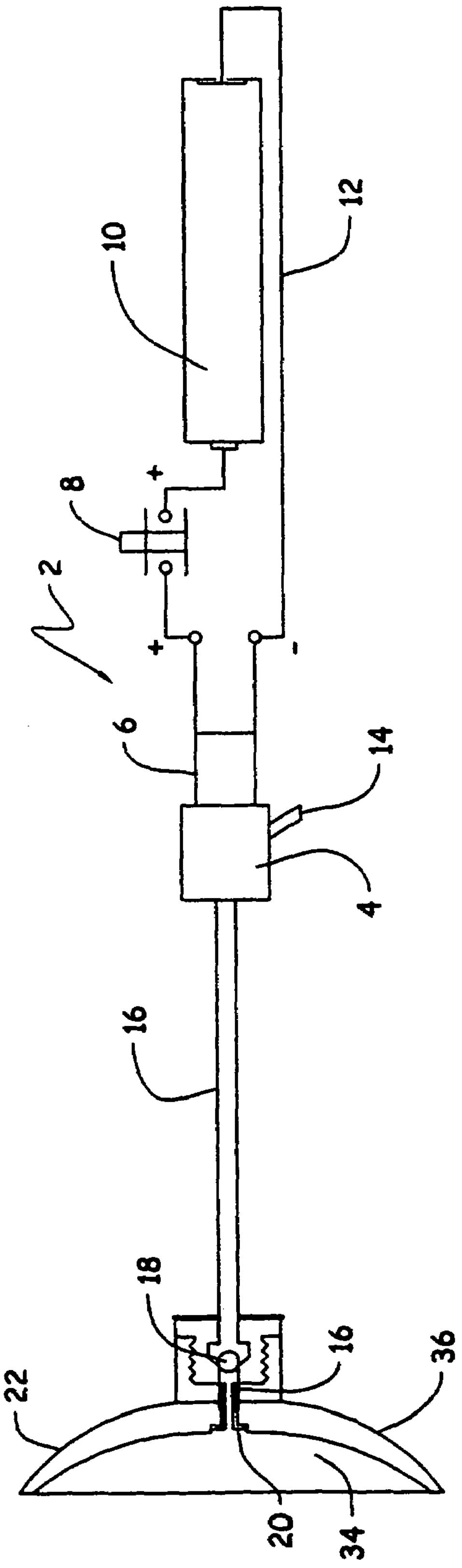
FIG. 3 is a full internal side view along line A—A of the light bulb changer

FIG. 3 is an internal side view of the light bulb changer 2 along line A—A with emphasis on the vacuum pump 4 which is powered by the motor 6. The power source 10 in this embodiment is a rechargeable power source that is connected to the motor 6 via electrical circuitry 12. Also present is a power switch 8 which once activated allows the electrical current to flow through the electrical circuitry 12 which allow the current flow to move past the power switch 8 to the motor 6 that energizes the vacuum pump 4 that draws the air into the vacuum pump 4 and in conjunction with the check valve 18 allows a depressurized zone to develop in the inside bottom surface 34 of the vacuum cup 22. The vacuum pump 4 has a vacuum pump exhaust 14 which allows the expelling of air to form the vacuum created around the depressurized zone. When the vacuum is engages it draws the air from the vacuum intake head 20 through vacuum line 16 which penetrates the outside surface 36 of the vacuum cup 22 from the check valve 18, through another section of vacuum line 16 to the vacuum pump 4. The vacuum pump will actually change its pitch when it has securely engaged the light bulb. In other words when the bulb is completely engaged the revolutions of the pump increase giving a sure indication that the vacuum is complete. It should also be understood that the overall size of the vacuum cup 22, vacuum pump 4 and outer casing 26 are only limited to the size of the units application.

The instant device is truly unique in that by simply pushing a switch the vacuum is created. If the vacuum cup 22 is placed against the surface of a light bulb and the switch is activated a zone of decompression is created against the surface of the bulb allowing the operator to manipulate that bulb either to install a new bulb or remove an extinguished bulb. The vacuum cup assembly 54 is produced in a wide verity of shapes and sizes accommodating the verity of light bulbs available for residential, commercial and industrial applications. The outer casing 26 also is available in a range of length designed to fit applications that span residential, commercial and industrial uses.

The safety that is derived from the device is superior in that it eliminates the need for ladders. One not secure with the use of ladder or one insecure with heights is free to change light bulbs from the safety of the ground. The device can also be used to adjust the direction of can light, track lighting or spot lighting without leaving the safety of the ground. Another advantage of the present device is it allows the user to get inside of track lighting canisters or can lights that do not have enough clearance inside for one's hand to manipulate the bulb either to install or remove it. The process of replacement or removal is also now hands free reducing the possibility of injury from braking or broken glass. Overall there is a great deal of convenience derived from the instant device. Due to the nature of some lighting fixtures meaning that inherent to their inexpensive construction the internal components are weak or tend to loosen over time. This situation lends itself to another advantage of the instant device that is with a firm hold on the bulb it is removed safely from the fixture.

What is claimed is:

1. A light bulb changer comprising in combination an outer casing, said outer casing having a near end and a distal end, said near end having mounted thereon, a vacuum cup assembly, wherein said cup of the vacuum cup assembly has an inside bottom surface; the distal end of the outer casing having attached thereto, an extension attachment, said extension attachment having a distal end, said distal end of the extension attachment configured to provide an extension handle;

said vacuum cup assembly having a near end and a distal end, said vacuum cup distal end being connected to a flexible neck, said vacuum cup near end comprising a vacuum cup, said vacuum cup having an outside surface and inside bottom surface and a protrusion therethrough incorporating a vacuum intake head;

said outer casing containing therein a vacuum pump, said vacuum pump being located near the near end of the outer casing, said vacuum pump having a near end and a distal end and an outside surface, said vacuum pump near end having connected thereto, a first vacuum line, the distal end of the vacuum pump having connected thereto an electrically driven motor, said outside surface of the vacuum pump having therein an exhaust port, said electrical motor being electrically connected to a power switch and said power switch being electrically connected to a power source, said electrical connection connecting to said motor completing a circuit;

said first vacuum line having a near end and a distal end, said first vacuum line near end containing a check valve, said first vacuum line distal end being connected to the vacuum pump;

said check valve having a near end, a distal end, an internal passageway and an in-line check system, said check valve near end connected to a second vacuum line, said check valve distal end connected to a the first vacuum line;

said second vacuum line near end being connected to the vacuum intake head, said vacuum intake head having a near end and a distal end, said vacuum intake head distal end being connected to said second vacuum line, said vacuum intake head near end having a centered opening therethrough that allows for the passage of air and is essentially in the bottom inside surface of the vacuum cup;

said flexible neck having a near end and a distal end, said distal end of the flexible neck being connected to the outer casing and the near end being connected to the vacuum cup assembly;

a release mechanism having a near end and a distal end, said release mechanism near end connected to the outside surface of the vacuum cup, said release mechanism distal end being attached to a pull device.

2. A light bulb changer as claimed in claim 1 wherein said power source is a rechargeable battery.

3. A light bulb changer as claimed in claim 1 wherein said power source is battery powered.

4. A light bulb changer as claimed in claim 1 wherein the outer casing has an access door for replacing or changing batteries.

5. A light bulb changer as claimed in claim 1 wherein at least a portion of the outer casing is flexible.

6. A light bulb changer as claimed in claim 1 wherein the release mechanism is externally mounted to the vacuum cup assembly.

7. A light bulb changer as claimed in claim 1 wherein the release mechanism has plurality of length.

8. A light bulb changer as claimed in claim 1 wherein said vacuum cup assembly has a plurality of vacuum cup sizes.

9. A light bulb changer as claimed in claim 1 wherein said power source is AC/DC with a power cord.

10. A light bulb changer as claimed in claim 1 wherein said release mechanism is partially internal to said outer casing.

11. A light bulb changer as claimed in claim 1 wherein said cup assembly is attached to the outer casing via a set screw.

12. A light bulb changer as claimed in claim 1 wherein said extension attachment holds extensions in place a via set screw.

13. A light bulb changer as claimed in claim 1 wherein said device is used to adjust the position of light fixtures.

* * * * *